US007042530B2

(12) United States Patent
Chino et al.

(10) Patent No.: US 7,042,530 B2
(45) **Date of Patent: *May 9, 2006**

(54) TRANSFER APPARATUS

(75) Inventors: Naoyoshi Chino, Kanagawa (JP); Yasunori Tanaka, Kanagawa (JP); Masato Mizuno, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 186 days.

This patent is subject to a terminal disclaimer.

(21) Appl. No.: 10/704,904

(22) Filed: Nov. 12, 2003

(65) Prior Publication Data

US 2004/0095293 A1 May 20, 2004

Related U.S. Application Data

(63) Continuation of application No. 09/972,964, filed on Oct. 10, 2001, now Pat. No. 6,714,265.

(30) Foreign Application Priority Data

Oct. 10, 2000 (JP) ............................. 2000-308889

(51) Int. Cl.
*G02F 1/13* (2006.01)

(52) U.S. Cl. ....................... 349/2; 349/1; 349/2; 349/3; 349/4; 353/20

(58) Field of Classification Search .................... 349/2; 353/20; 358/1.16, 1.15
See application file for complete search history.

(56) References Cited

U.S. PATENT DOCUMENTS

| | | | | |
|---|---|---|---|---|
| 4,334,734 | A | 6/1982 | Hareng et al. | |
| 4,486,760 | A | 12/1984 | Funada et al. | |
| 4,790,632 | A | 12/1988 | Miyakawa et al. | |
| 4,842,379 | A | 6/1989 | Oishi et al. | |
| 5,321,789 | A | 6/1994 | Kida et al. | |
| 5,970,215 | A | 10/1999 | Stephenson | |
| 6,421,103 | B1 | 7/2002 | Yamaguchi | |
| 6,714,265 | B1 * | 3/2004 | Chino et al. | 349/2 |

FOREIGN PATENT DOCUMENTS

| | | |
|---|---|---|
| JP | 58193175 | 11/1983 |
| JP | 58193522 | 11/1983 |
| JP | 63-269142 A | 11/1988 |

(Continued)

OTHER PUBLICATIONS

"Color TFT Liquid Crystal Display", p. 207, published by Kyoritsu Shuppan.

*Primary Examiner*—Twyler M. Lamb
(74) *Attorney, Agent, or Firm*—Sughrue Mion, PLLC

(57) ABSTRACT

The transfer apparatus includes a light source, a transmission type image display device in which a liquid crystal layer is held between two sets of substrates and polarizing plates and a photosensitive recording medium. The light source, the image display device and the photosensitive recording medium are arranged in series along a direction in which light from the light source advances and the image display device and the photosensitive recording medium are arranged in a non-contact state. A display image transmitted from the transmission type image display device is transferred to the photosensitive recording medium. A distance between the image display device and the photosensitive recording medium and a sum total of thicknesses of the substrate and the polarizing plate at least on a side of the photosensitive recording medium in the image display device are set in accordance with a definition of the display image.

2 Claims, 3 Drawing Sheets

FOREIGN PATENT DOCUMENTS

| | | | |
|---|---|---|---|
| JP | 02062254 | | 3/1990 |
| JP | 01-39112 | | 10/1990 |
| JP | 4-194832 | | 7/1992 |
| JP | 04-342246 | A | 11/1992 |
| JP | 06-19106 | A | 1/1994 |
| JP | 63168373 | | 7/1998 |
| JP | 10-309829 | | 11/1998 |
| JP | 11-242298 | | 9/1999 |
| JP | 2000-309124 | A | 11/2000 |
| JP | 02001188230 | A | 7/2001 |

* cited by examiner

TRANSFER APPARATUS

This is a continuation of application Ser. No. 09/972,964 filed Oct. 10, 2001 now U.S. Pat. No. 6,714,265, the disclosure of which is incorporated herein by reference. U.S. Application Ser. No. 09/972,964 claimed priority from Japanese application 2000-308889, filed on Oct. 10, 2000.

BACKGROUND OF THE INVENTION

1. Field of the Invention

The present invention relates to a transfer apparatus which displays an image recorded in digital form by a digital still camera (DSC), a video camera, a personal computer or the like through a transmission type image display device formed by a liquid crystal display device (LCD), and transfers the displayed image to a photosensitive recording medium such as an instant photographic film which develops color by light, thereby forming an image.

2. Description of the Related Art

Conventionally known examples of a method for transferring (i.e., printing) or recording a digitally-recorded image to or on a photosensitive recording medium include an ink jet system using a dot-type printing head, a laser recording system, and a thermal recording system.

A printing system like the ink jet system has various problems. For example, printing takes time, ink is likely to cause clogging, and precision printing results in the sheet being moistened by ink. The laser recording system involves an expensive optical component such as a lens, resulting in high apparatus cost. Further, the laser recording system and the thermal recording system require considerable power consumption, and are not suited to be carried about.

Thus, generally speaking, the transfer apparatuses used in these systems and, in particular, the ones used in the ink jet system have a problem in that the more precise the apparatus, the more complicated the driving mechanism and the control mechanism, and the larger and the more expensive the apparatus, printing taking a lot of time.

In this regard, JP 10-309829 A and JP 11-242298 A disclose transfer apparatuses of the type in which a display image is formed on a photosensitive recording medium like an instant film by using a liquid crystal device, thereby achieving simplification in structure and a reduction cost.

The electronic printer disclosed in JP 10-309829 A is capable of copying the display screen of a liquid crystal display on a photosensitive medium to produce a hard copy of a quality equal to that of a photograph. However, in order to copy the display screen of the liquid crystal display on the photosensitive medium in this electronic printer, an optical component such as a rod lens array is arranged between the display screen of the liquid crystal display and the photosensitive medium, so that a predetermined distance (total conjugate length) is required between them. In the example shown, the requisite distance is 15.1 mm. Further, the optical component is rather expensive.

In the case of the transfer apparatus disclosed in JP 11-242298 A, there is no need to use an expensive optical component such as a lens or to secure an appropriate focal length. Thus, as compared with the conventional transfer apparatuses, a further reduction can be achieved in terms of size, weight, power consumption, and cost. As shown in FIG. 7, a photosensitive film 400 is closely attached to the display surface of a transmission type liquid crystal display (hereinafter referred to as LCD) 300, and a light source (back light 100) provided on the opposite side of the photosensitive film 400 with respect to the LCD 300 is turned on. That is, a fluorescent lamp 101 is switched on to turn on the back light, whereby the image displayed on the LCD 300 is transferred to the photosensitive film 400.

Further, as shown in FIG. 8, the above-mentioned publication discloses another-embodiment, according to which a lattice 200 is provided between the back light 100 and the LCD 300, whereby diffusion of light from the back light 100 is restrained. That is, the light is approximated to parallel rays. Further, by providing a spacer 201 consisting of a rectangular hollow member between the lattice 200 and the LCD 300, it is possible to prevent the image of the frame of the lattice 200 (the shadow due to the frame) from being taken by the photosensitive film 400, thus improving the clarity of the image formed on the photosensitive film 400 to a satisfactory degree from the practical point of view without providing an optical component or securing an appropriate focal length.

Further, as shown in FIG. 7, the publication discloses an example of a transfer apparatus in which the thickness of the LCD 300, that is, the sum total of the thicknesses of the following components: a polarizing plate 301 on the display surface side, a glass substrate 302, a liquid crystal layer 303, a glass substrate 304, and a polarizing plate 305 on the back light 100 side is 2.8 mm and in which the image on the screen of the LCD 300 with a dot size of 0.5 mm is transferred to the photosensitive film 400. To prevent diffusion of the light from the LCD 300, there is provided a 5 mm lattice with a thickness of 10 mm, and a 20 mm spacer 201 is arranged between the lattice 200 and the LCD 300. Further, the LCD 300 and the photosensitive film 400 are closely attached together to effect image transfer without involving blurring (unclarityl of the image.

In this case, an image displayed with a dot size of 0.5 mm is transferred with an enlarge dot size of up to 0.67 mm, which means an enlargement by approximately 0.09 mm on one side, and yet the image obtained is satisfactory from the practical point of view.

As described above, in the transfer apparatus disclosed in JP 11-242298 A, image transfer is effected, with the liquid crystal display (LCD) and the photosensitive film being closely attached together, to prevent blurring (unclarity) of the image and to obtain an image satisfactory from the practical point of view. It is to be noted, however, that exposure of the photosensitive film in this arrangement involves the following problems.

First, as shown in FIG. 7, on the outermost surface of the LCD 300, there is arranged the film-like polarizing plate 301, which is closely attached to the photosensitive film 400 during exposure. When the photosensitive film 400 is moved to perform a post-processing, the photosensitive film 400 and the polarizing plate 301 are rubbed against each other to thereby flaw the film-like polarizing plate 301, and the flaw on the polarizing plate 301 is transferred to the photosensitive film 400. Further, this flaw causes scattering of light, resulting in deterioration in the image quality.

It might be possible for the polarizing plate and the photosensitive film to be closely attached together during exposure and slightly spaced apart from each other when the photosensitive film is moved. For this purpose, however, it would be necessary to provide, apart from the photosensitive film moving mechanism, a mechanism for effecting close attachment and detachment of the photosensitive film, which is contradictory to the requirement for a reduction in cost and size.

Further, generally speaking, a photosensitive film, for example, an instant film, which is the easiest to use, is kept in a lightproof case until it is loaded in a transfer apparatus.

Since this lightproof case is equipped with an opening frame somewhat larger than the film, the following procedures must be followed before the photosensitive film can be brought into close contact with the polarizing plate.

First, prior to exposure, one photosensitive film is extracted singly from the lightproof case, and brought into close contact with the surface of the polarizing plate on the surface of the LCD. In this condition, exposure is performed, and, after the completion of the exposure, the photosensitive film is separated from the polarizing plate surface, and moved for a next processing (In the case of an instant film, a processing liquid tube provided in the film sheet is pushed open).

These procedures must be repeated for each photosensitive film. In particular, separating the photosensitive film from the polarizing plate surface does not square with automation (or mechanization).

Recently, the screens of LCDs have progressed in terms of definition, and LCDs with an increased number of pixels and a smaller dot size are being commercialized. For example, as LCDs using low-temperature polysilicon type TFTs, UXGA (10.4 inches; 1200×1600 pixels), XGA (6.3 and 4 inches; 1024×768 pixels) are on the market.

An attempt to apply an LCD with such a high-definition screen to the transfer apparatus disclosed in JP 11-242298 A would lead to the following problem. In the case of UXGA, the dot size of each of the RGB pixels is approximately 0.04 mm on the shorter side. In a transfer apparatus as disclosed in the above-mentioned publication, in which enlargement in dot size is involved, it would be impossible to transfer an LCD image of such a minute dot size to a photosensitive film with satisfactory clarity in a condition in which the dots of the RGB pixels are clearly distinguishable.

SUMMARY OF THE INVENTION

It is an object of the present invention to eliminate the above problems in the prior art and to provide a transfer apparatus which can realize a substantial reduction in size, weight, power consumption, and cost with a simple structure and which can also be formed as a portable device.

Another object of the present invention is to provide a transfer apparatus which is applicable to various types of liquid crystal displays ranging from a liquid crystal display of an ordinary pixel density to a liquid crystal display with a high definition screen having a high pixel density and which makes it possible to obtain a photographic image of a desired degree of clarity, from a photographic image which is satisfactory from the practical point of view to a high-definition photographic image of a higher level of clarity.

To achieve the above objects, the present inventors have conducted careful study on a transfer apparatus which makes it possible to obtain a photographic image of a desired degree of clarity, which is of higher practical value, and which allows use of a transmission type image display device, such as a liquid crystal display, which has a high-definition screen of a high pixel density in a structure in which the liquid crystal layer is held between two sets of substrates and polarizing plates. As a result of the study, the present inventors have found that, to prevent blurring (unclarity) of the image, which is inevitably generated when bringing the transmission type image display device and the photosensitive recording medium out of contact with each other, that is, when separating them from each other to achieve a higher practical value with a simple structure, it is necessary to set the sum total of the thicknesses of the substrate and the polarizing plate on the photosensitive recording medium side of the transmission type image display device in accordance with the separation distance between the two components.

The present invention provides a transfer apparatus comprising a light source, a transmission type image display device in which a liquid crystal layer is held between two sets of substrates and polarizing plates and a photosensitive recording medium wherein the light source, the transmission type image display device and the photosensitive recording medium are arranged in series along a direction in which light from the light source advances, and a display image transmitted from the transmission type image display device is transferred to the photosensitive recording medium, and wherein the transmission type image display device and the photosensitive recording medium are arranged in a non-contact state, and a distance between the transmission type image display device and the photosensitive recording medium and a sum total of thicknesses of a substrate and a polarizing plate at least on a side of the photosensitive recording medium in the transmission type image display device are set in accordance with a definition of the display image.

Preferably, the sum total is not more than 1.0 mm.

Preferably, the distance is 0.01 mm to 3 mm.

Preferably, the display image and the image transferred to the photosensitive recording medium are substantially identical in size.

Preferably, each pixel size of the image display device is not more than 0.2 mm.

It is preferable that the transfer apparatus further comprises a substantially parallel rays generating element arranged between the light source and the image display device.

Preferably, the substantially parallel rays generating element comprises a porous plate having a plurality of through-holes, and wherein the porous plate has a thickness not less than three times the diameter or equivalent diameter of the plurality of through-holes.

Preferably, the plurality of through-holes are parallel to each other and have a circular or polygonal cross section.

DETAILED DESCRIPTION OF THE PREFERRED EMBODIMENTS

A transfer apparatus according to a preferred embodiment of the present invention will now be described in detail with reference to the accompanying drawings.

Figure 1:
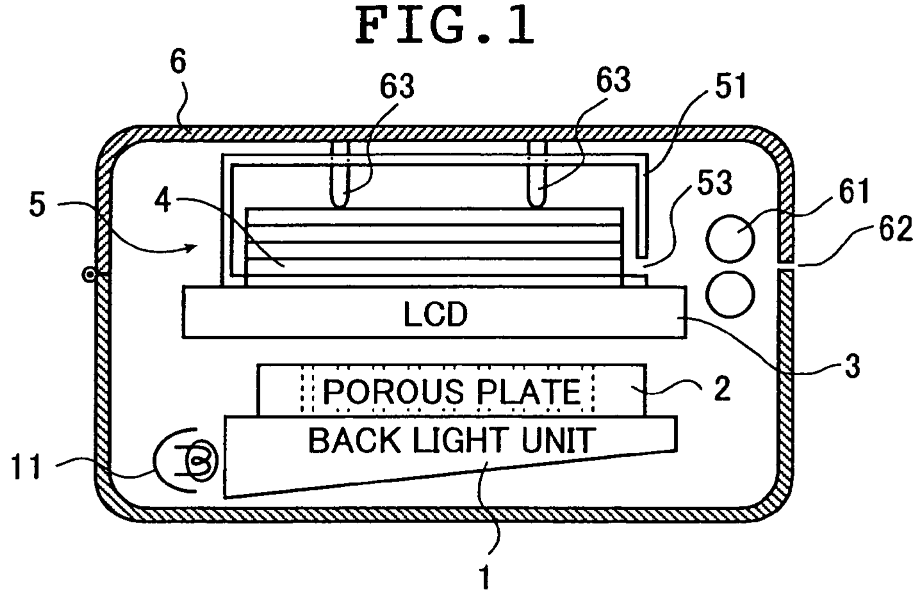
FIG. 1 is a schematic side sectional view of a transfer apparatus according to an embodiment of the present invention.
Figure 2:
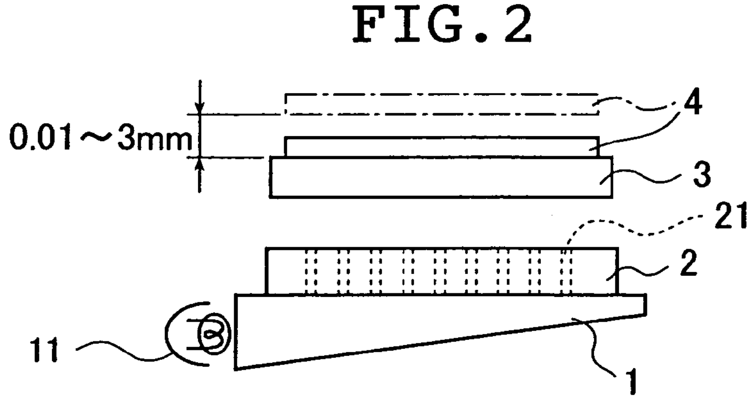
FIG. 2 is a conceptual side sectional view showing a main portion of the transfer apparatus shown in FIG. 1.

FIG. 1 is a schematic side sectional view of a transfer apparatus according to an embodiment of the present invention, and FIG. 2 is a conceptual side sectional view showing a main portion of the transfer apparatus shown in FIG. 1.

As shown in these drawings, the transfer apparatus of the present invention comprises a back light unit 1 serving as a light source, a porous plate 2 for generating substantially parallel rays, a liquid crystal display device (LCD) 3 for displaying an image recorded in digital form, a film case 51 accommodating photosensitive films 4, and a main body case 6 containing the back light unit 1, the porous plate 2, the LCD 3, and the film case 51.

The porous plate 2, the LCD 3, and the photosensitive films 4 are arranged in series along the direction in which the light from the back light unit 1 advances. At least the LCD 3 and the photosensitive films 4 are arranged in a non-contact state. If it is possible to emit light of sufficient intensity from the back light unit 1 for effecting exposure of the photosensitive film 4 in a short time with the display image transmitted through the LCD 3, there is no need to provide the porous plate 2.

The back light unit 1 serving as the light source irradiates the LCD 3 all over from behind with uniform light, and is a planar light source having a light emission surface substantially the same as the display screen of the LCD 3. It comprises a bar-like lamp 11 such as a cold cathode tube, a light guide plate (not shown) for introducing the light emitted from the bar-like lamp 11 in a predetermined direction, a reflection sheet (not shown) for reflecting the light introduced to the light guide member in a direction substantially perpendicular thereto, and a back light assembly having a diffusion sheet (not shown) for uniformalizing the light reflected by the reflection sheet, a prism sheet, etc.

There are no particular limitations regarding the back light unit 1 used in the present invention. It may be of any type as long as it is a planar light source which uniformly diffuses light emitted from a cold cathode tube 11 by using a back light assembly composed of a light guide plate, a reflection sheet, a diffusion sheet, a prism sheet, etc. It is possible to use a well-known LCD back light unit. In the example shown, the size of the light emitting surface may be the same as the size of the display screen of the LCD 3 or the photosensitive surface of the photosensitive film 4. However, this should not be construed restrictively. It may be somewhat larger than the size of the display screen of the LCD 3 or the photosensitive surface of the photosensitive film 4.

As long as it is a planar light source capable of emitting light of a desired intensity, the back light unit 1 used in the present invention may also comprise an LED array light source, a light source using an organic or inorganic EL panel or the like.

As needed, the porous plate 2 used in the present invention is arranged between the back light unit 1 and the LCD 3, and converts the light from the back light unit 1 into parallel rays. It is a substantially parallel rays generating element for making, as much as possible, the light impinging upon the LCD 3 parallel rays, and is a rectangular plate of a predetermined thickness having a large number of through-holes 21 of a predetermined size arranged at a predetermined pitch.

Figures 6A, 6B, 6C:
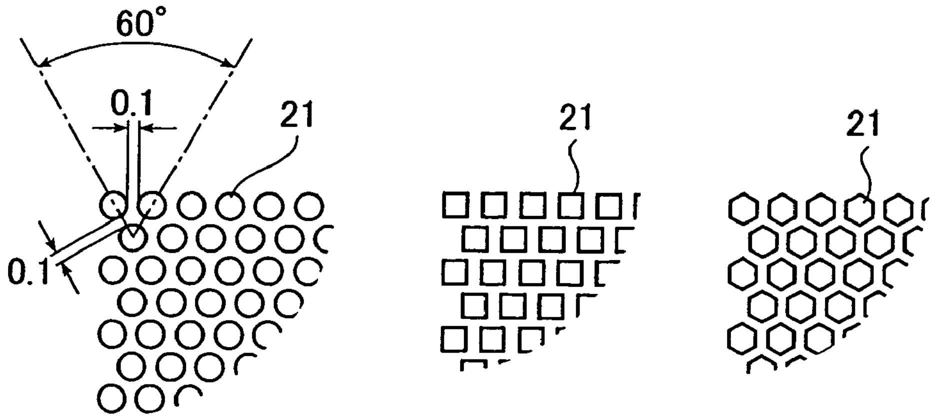
FIG. 6A is a diagram illustrating the arrangement of through-holes in a porous plate used in the embodiment.
FIG. 6B shows an example of a substantially parallel rays generating element used in the present invention.
FIG. 6C shows another example of the substantially parallel rays generating element used in the present invention.

There are no particular limitations regarding the substantially parallel rays generating element used in the present invention as long as it is endowed with the same function. Thus, instead of the porous plate 2, it is also possible to use a square lattice shown in FIG. 6B, a hexagonal lattice shown in FIG. 6C or the like. However, in view of the ease with which it can be produced, it is desirable to use a porous plate.

Further, in the present invention, the distance between the porous plate 2 and the LCD 3 is set at preferably 0.05 to 10 mm, and more preferably, 0.1 mm to 5 mm. This measure is taken for the purpose of preventing the pattern of the through-holes 21 of the substantially parallel rays generating element, e.g., the porous plate 2, from appearing in the form of a “shadow” due to the diffused light. The above setting of the distance is made such that the appearance of the “shadow” as mentioned above can be prevented, without deteriorating the clarity of the transferred image.

There are no particular limitations regarding the material of the porous plate 2. It is possible, for example, to use a metal plate such as an aluminum plate, a resin plate or a carbon plate having a predetermined thickness. Nor are there any particular limitations regarding the thickness of the porous plate 2. It may be appropriately selected in accordance with the requisite clarity of the transferred image or the size of the display screen of the LCD 3 and the photosensitive surface of the photosensitive film 4. From the practical point of view, the porous plate 2 may be produced by, for example, stacking porous sheets together or resin molding. However, there are no particular limitations in this regard. It may be produced by any method including a method by which holes are formed by machining.

Further, the plurality of through-holes 21 provided in the porous plate 2 may be arranged in any form and at any pitch as long as the through-holes 21 are arranged uniformly. For example, they may be arranged in a lattice-like fashion or a zigzag fashion (a close-packed fashion), with the zigzag fashion being preferable. The pitch at which the through-holes 21 are arranged is preferably as small as possible. Each distance between adjacent two through-holes 21 is preferably in the range of 0.05 to 0.5 mm and more preferably 0.05 to 0.3 mm.

Further, there are no particular limitations regarding the configuration of the through-holes 21 provided in the porous plate 2. It may be, for example, cylindrical, cylindroid-like, or prism-like. That is, the sectional configuration of the through-holes 21 is not limited particularly and may be, for example, circular, elliptical or polygonal. However, to facilitate the preparation, it is desirable for the sectional configuration of the through-holes 21 to be circular or polygonal. Further, while it is desirable for the through-holes 21 to be parallel through-holes extending in the thickness direction of the porous plate 2, they may also be usable as long as they are to be regarded as parallel.

Further, while there are no particular limitations regarding the size of the through-holes 21, it is desirable for the diameter (in the case of circular holes) or the equivalent diameter (in the case of elliptical holes, polygonal holes, etc.) of the through holes 21 of the porous plate 2 to be not more than 0.5 mm, and it is desirable for the thickness of the porous plate 2 to be not less than three times the diameter or equivalent diameter of the through-holes 21. The above-mentioned equivalent diameter is a dimension expressed as “4×area/total-peripheral-length (or total circumferential length)”. The diameter or equivalent diameter of the through-holes 21 of the porous plate 2 is set at not more than 5 mm, and the thickness of the porous plate 2 is set at not less than three times the diameter or equivalent diameter of the through-holes 21 because these settings are effective in obtaining parallel rays by means of the porous plate 2.

It is desirable to provide a reflection reducing coating on the entire surface of the porous plate 2 including the inner surfaces of the through-holes 21. There are no particular limitations regarding the reflection reducing coating as long as its reflectance is not more than a predetermined value. Examples thereof include a black plating, a blackened coating, and a black paint coating. In the present invention, it is desirable for the reflectance to be not more than 2%. If the reflectance is not more than 2%, the scattered light other than the parallel rays from the back light unit 1 can be efficiently absorbed, and it is possible to efficiently emit only the substantially parallel rays (including parallel rays) from the back light unit 1 and cause them to impinge upon the LCD 3. The reflectance rate can be measured at a Wavelength of 550 nm, using, for example, MPC 3100 spectroreflectometer manufactured by Shimadzu Corporation.

The LCD 3 is a transmission type image display device for displaying digitally-recorded images. It is connected to the digital image data supply portion of a digital still camera, a digital video camera, a personal computer or the like, and displays a display image as a transmitted image in accordance with the digital image data supplied. In the digital image data supply portion of a digital camera or the like connected to the LCD 3, an arbitrary image can be selected from among images prepared beforehand and supplied. Apart from the above, the digital image data supplied to the LCD 3 may also be data read from a transmission original or a reflection original by a scanner or the like. Further, the LCD 3 may be of any type as long as it can display an image as a transmitted image. It may be of the type which displays an image on the basis of analog image data on an image taken by an ordinary video camera instead of digital image data. A predetermined gap is provided between the LCD 3 and the porous plate 2. As stated above, this gap is preferably 0.05 mm to 10 mm, and more preferably 0.1 mm to 5 mm. It is desirable for the gap to be adjustable to an arbitrary dimension.

Figure 3:
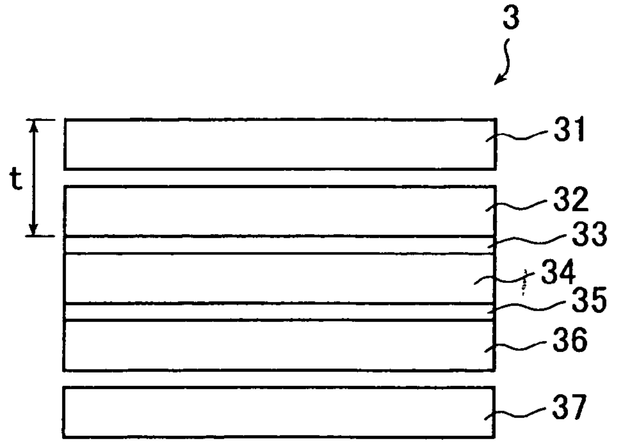
FIG. 3 is a perspective view showing the construction of an embodiment of a transmission type liquid crystal image display device used in the transfer apparatus shown in FIG. 1.

As shown in FIG. 3, the LCD 3 is formed by stacking together, from the photosensitive film 4 side toward the porous plate 2 side (the back light unit 1 side), a film-like polarizing plate (hereinafter also referred to as the polarizing film) 31, a glass substrate 32, an electrode 33, a liquid crystal layer 34, an electrode 35, a glass substrate 36, and a film-like polarizing plate 37, the liquid crystal layer 34 being held between the glass substrates 32 and 36 and further held by means of the polarizing plates 31 and 37 from both outsides thereof. It goes without saying that although not shown, there are further provided a barrack matrix, an RGB color filter, an orientation film, etc., as is well known in the art. For example, in the case of a TFT type LCD, the electrode 33 is a common electrode, and the barrack matrix, the RGB color filter, etc. are arranged between the electrode 33 and the glass substrate 32, the electrode 34 consisting of a display electrode, a gate electrode, etc. Instead of the glass substrates 32 and 36, it is also possible to use resin substrates or the like.

Regarding the construction of the LCD 3, it may be a well-known one, as long as image display is possible, except for the sum total of the thicknesses of the polarizing film 31 and the glass substrate 32 on the photosensitive film 4 side described below. It may be an LCD having a well-known liquid crystal display mode and driven by a well-known driving system. Examples of the liquid crystal display mode include liquid crystal display modes using a polarizing plate, such as TN mode, STN mode, CSH mode, FLC mode, and OCB mode. Examples of the driving system include active matrix driving systems using TFTs, diodes, etc. and direct matrix driving systems using XY stripe electrodes.

There are no limitations regarding the size of the LCD 3. It is possible to select an appropriate size in accordance with the size of the photosensitive film. Further, there are no particular limitations regarding the dot size of each RGB pixel of the LCD 3. However, to obtain a clearer photographic image of high quality, it is desirable for the size of each pixel on the shorter side to be not more than 0.2 mm. If the size is not more than 0.2 mm, it is possible to obtain a clearer transfer image.

There are no particular limitations regarding the number of pixels (or pixel density) of the LCD 3. However, to obtain a high-quality transfer image of high definition and high clarity, it is desirable to use an LCD having a high-definition screen with a small RGB pixel dot size which is recently on the market. Examples of such an LCD include TFT type LCDs, such as UXGA (10.4 inches; 1200×1600 pixels) and XGA (6.3 and 4 inches; 1024×768 pixels).

In the LCD 3 used in the present invention, it is desirable for the sum total t of the thicknesses of the substrate 32 and the polarizing film 31 at least on the photosensitive film 4 side to be as small as possible. It is set at not more than 1.0 mm, more preferably not more than 0.8 mm, and most preferably not more than 0.6 mm. Still more preferably, it is desirable for the sum total of the thicknesses of the substrate 36 and the polarizing film 37 on the back light unit 1 (the porous plate 2) side to be also small. It is set preferably at not more than 1.0 mm, more preferably not more than 0.8 mm, and most preferably not more than 0.6 mm.

While there are no particular limitations regarding lower limit values, it is possible, for example, to limit the thickness of the glass substrate 32 as not less than 0.5 mm since the thickness of the glass substrate 32 can only be reduced to approximately 0.5 mm. The sum total thickness values as mentioned above should not be construed restrictively. To realize the above condition, it is also effective to use resin substrates instead of the glass substrates. In that case, the lower limit value of approximately 0.5 mm can be further reduced.

The reason for limiting the sum total t of the thicknesses of the substrate 32 and the polarizing film 31 on the photosensitive film 4 side to not more than 1.0 mm in the present invention will be explained below.

By thus limiting the sum total of the thicknesses of these components, diffusion of light in the section between the back light unit 1 and the LCD 3 is restrained, and, if, strictly speaking, the display surface of the LCD 3 and the photosensitive surface of the photosensitive film 4 are held in a non-contact state, it is possible to obtain a clearer transfer image.

That is, in the transfer apparatus of the present invention, the display surface of the LCD 3 and the photosensitive surface of the photosensitive film 4 spaced apart from each other by a predetermined distance to hold them in a non-contact state. This is certainly a condition necessary for obtaining a transfer apparatus which has a simple structure and which is of higher practical value and easy to handle. On the other hand, this is rather undesirable from the viewpoint of obtaining a clear transfer image since it aggravates the light diffusion between the display surface of the LCD 3 and the photosensitive surface of the photosensitive film 4. In view of this, in the present invention, the disadvantage due to the non-contact state (the increase in light diffusion) is compensated for by the advantage due to the above-mentioned sum total thicknesses (the suppression of light).

Figure 7:
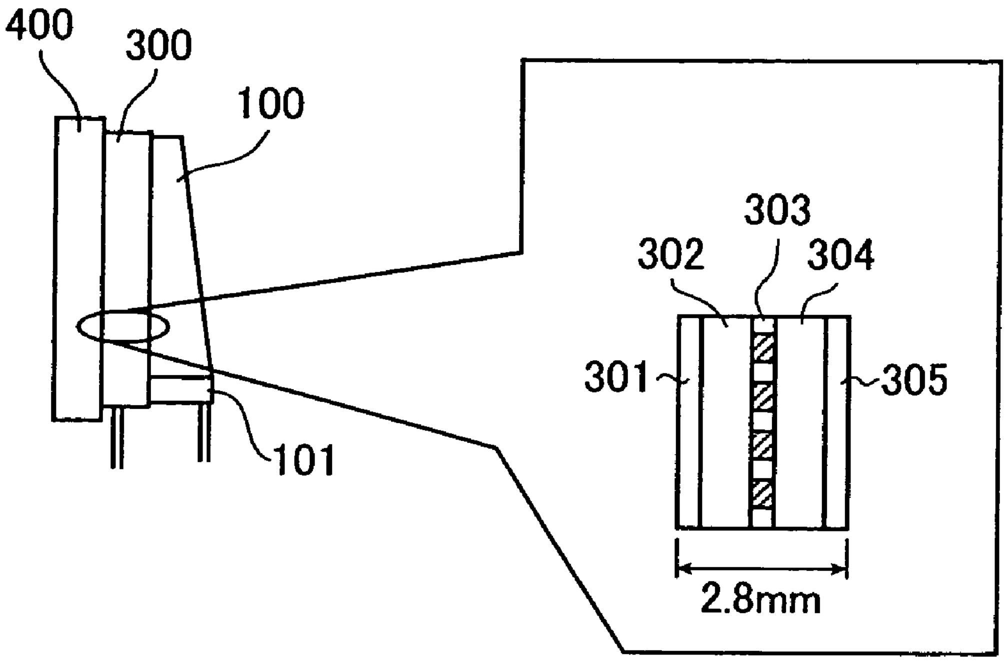
FIG. 7 PRIOR ART
FIG. 7 is a side view showing the construction of an example of a conventional transfer apparatus.
Figure 8:
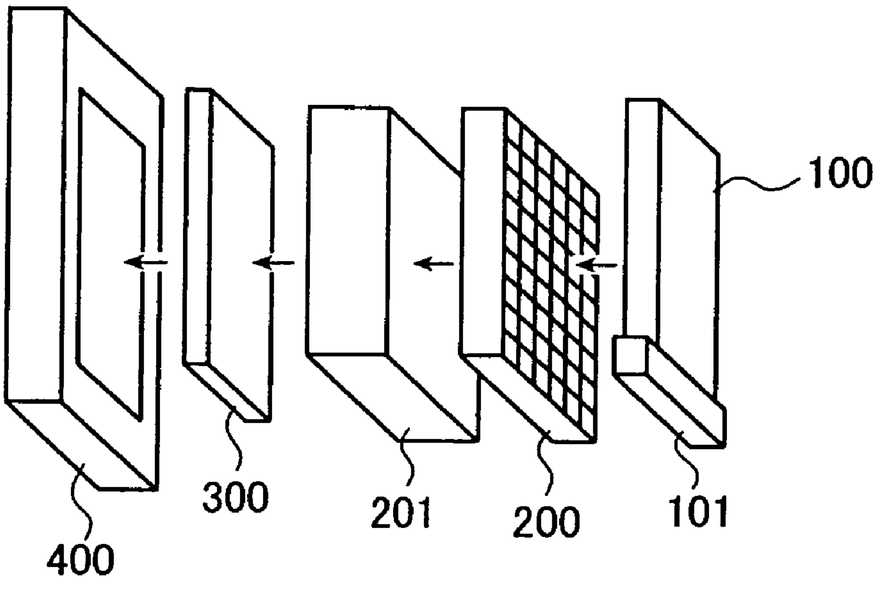
FIG. 8 PRIOR ART
FIG. 8 is a perspective view showing the construction of another example of a conventional transfer apparatus.

As stated above, the conventional transfer apparatus disclosed in JP 11-242298 A, shown in FIG. 7, uses an LCD having a thickness of approximately 2.8 mm. As shown in FIG. 7, the LCD comprises the two polarizing plates 301 and 305, the two substrates 302 and 304, and the liquid crystal layer 303 held between them. Although not stated in the above-mentioned publication, generally speaking, the thickness of liquid crystal itself is approximately 0.005 mm (See "Color TFT Liquid Crystal Display", p 207, published by Kyoritsu Shuppan). Thus, it is to be assumed that the sum total of the thicknesses of the substrate 301 (305) and the polarizing plate 302 (304) is approximately 1.3 mm to 1.4 mm.

Light diffusion degree is in proportion to distance. Thus, when the above-mentioned thickness of 1.3 mm to 1.4 mm is reduced by half, the diffusion degree is also reduced by half, and it is to be assumed that the value "enlarged by approximately 0.09 mm on one side", referred to with reference to the prior art, is also reduced to ½, that is, approximately 0.04 mm to 0.05 mm. However, as stated with reference to the prior art technique, with this level of diffusion degree, overlapping of adjacent dots occurs in a latest LCD with a minute dot size, such as UXGA or XGA.

That is, when the diffusion degree is solely reduced to approximately 0.04 mm to 0.05 mm, the image obtained is rather unclear due to the occurrence of dot overlapping and color blurring attributable thereto. However, quite unexpectedly, a study by the present inventors has shown that, as stated above, by setting the sum total of the thicknesses of the substrate 32 and the polarizing film 31 at least on the photosensitive film 4 side at not more than 1.0 mm, the color blurring due to dot overlapping is eliminated even in the case of an LCD 3 of a minute dot size, such as UXGA or XGA, making it possible to obtain a clear transfer image. It is to be assumed that this is due to the fact that the scattering by the glass substrate 32 and the polarizing film 31 of the LCD 3 is reduced.

In the present invention, the photosensitive surface of the photosensitive film 4 is arranged with a predetermined gap between it and the display screen of the LCD 3.

The film case 51 accommodates a plurality of photosensitive films 4. In the present invention, it is possible to load a set (pack) of photosensitive films 4 in the film case 51 mounted inside the main body case 6 or to load a film pack 5 in which a plurality of photosensitive films 4 are accommodated in the detachable film case 51 in the main body case 6. It is desirable to adopt a construction in which the film pack 5 including the film case 51, that is, the film case 51 accommodating a plurality of photosensitive films 4 can be loaded.

The photosensitive film 4 is used as the photosensitive recording medium in the present invention. In the present invention, any type of photosensitive recording medium will do as long as it allows formation of a visible positive image by exposure printing of a transmitted display image in the LCD 3, and there are no particular limitations in this regard. For example, it is desirable to use a so-called instant photographic film or the like. Examples of the photosensitive film 4 used as the photosensitive recording medium include "instax mini" and "instax" (manufactured by Fuji Photo Film Co., Ltd.), which are mono-sheet type instant photographic films.

Such instant photographic films are commercially available in the form of a so-called film pack in which a predetermined number of films are accommodated in a film case.

Thus, in the present invention, if an arrangement is possible in which the gap between the photosensitive surface of the photosensitive film 4 and the display screen of the LCD 3 satisfies the condition mentioned below, it is possible to load the film pack 5 as it is in the main body case 6, as shown in FIG. 1.

Figure 4:
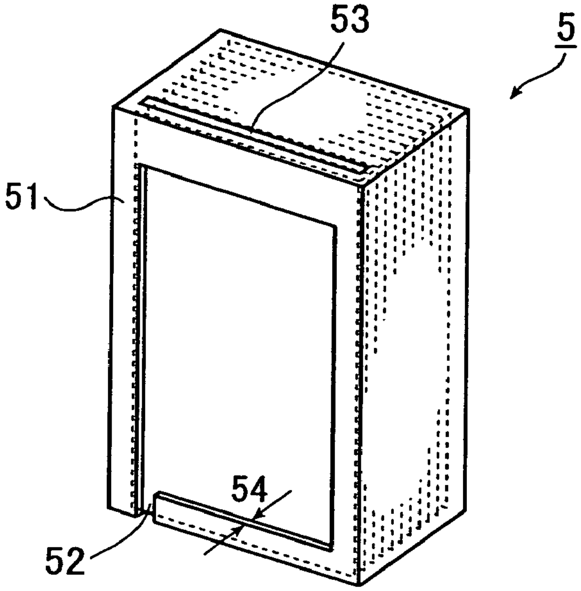
FIG. 4 is a perspective view showing the construction of an embodiment of a film pack used in the transfer apparatus shown in FIG. 1.

FIG. 4 shows the construction of an embodiment of the film pack 5.

At one end of the film case 51 of the film pack 5 shown, there is provided a cutout 52 which admits a claw member for extracting the film sheet 4 from the film pack 5 (the film case 51), and the film sheet 4 which has undergone exposure is extracted from an outlet 53 of the film case 51 of the film pack 5 by the above-mentioned claw member, and is transferred to a processing position by a conveying mechanism (not shown).

Here, the "processing" means pushing open a processing liquid (developer) tube (not shown) provided at one end of the film sheet 4 beforehand and causing the developer to be uniformly spread over the entire inner surface of the film sheet 4. It is executed substantially simultaneously with the extraction of the film sheet 4 from the film pack 5 and the conveyance thereof. After the processing, the film sheet 4 is conveyed to the exterior of the apparatus through an extraction outlet 62 of the main body case 6 (See FIG. 1).

As is well known, an instant photographic film of this type makes it possible to form a complete image for appreciation in about several tens of seconds after the above-mentioned processing. Thus, in the transfer apparatus of the present invention, the function of performing up to the above-mentioned processing is required. After one film sheet has been sent out, the next film sheet appears, realizing a preparation state for the next exposure (transfer).

Regarding the method of handling this film pack described above, the instant camera using an instant photographic film disclosed in commonly assigned JP 4-194832 A, is to be referred to.

In FIG. 4, numeral 54 indicates the height of the edge (stepped portion) of the film case 51 of the film pack 5. By setting the height 54 of this edge at a desired dimension, it is possible to set the distance between the display surface of the LCD 3 and the photosensitive surface of the photosensitive film 4 at a predetermined value as mentioned below.

Thus, in the present invention, apart from the fact that the height 54 of this edge is adjusted to a desired dimension, the film pack of a well-known conventional instant photographic film is applicable.

Also in the case in which the film case 51 is mounted in the main body case 6 beforehand and in which only one set of photosensitive films 4 is loaded in the film case 51, it is possible to set the distance between the display surface of the LCD 3 and the photosensitive surface of the photosensitive film 4 to a predetermined range as mentioned below by setting the height 54 of this edge at a desired dimension.

While, in the example shown in FIG. 1, the film case 51 is in direct contact with the display surface of the LCD 3 outside the effective image range of the photosensitive film 4, this should not be construed restrictively. When the height 54 of the edge of the film case 51 is small, the film case 51 may be mounted or loaded so as to be spaced apart from the display surface of the LCD 3 by a predetermined distance. Further, in the present invention, provided that the conditions mentioned below are satisfied, it is possible for the film case 51 to be in contact with the holding panel externally holding the display surface of the LCD 3.

As stated above, in the transfer apparatus of the present invention, in order to satisfy the conditions required for realizing an apparatus actually easy to handle, the LCD 3 and the photosensitive film 4 are in a non-contact state. Strictly speaking, the display surface of LCD 3 and the photosensitive surface of the photosensitive film 4 are held in a non-contact state and spaced apart from each other by a predetermined distance. In accordance with the present invention, from the viewpoint of obtaining a clear transfer image, the disadvantage due to the above arrangement, i.e., the increase in light diffusion, is compensated for by the advantage of the suppression of light diffusion which is achieved by making the sum total of the thicknesses t of the glass substrate 32 and the polarizing film 31 on the photosensitive film 4 side of the LCD 3 mentioned above not more than a predetermined dimension.

When it is said that the LCD 3 and the photosensitive film 4 are arranged in a non-contact state, it means that the display surface of the LCD 3 and the photosensitive surface of the photosensitive film 4 are spaced apart from each other by a predetermined distance and are not in direct contact with each other. Actually, as stated above, it is also possible to adopt an arrangement in which while the film case 51 of the film pack 5 is in contact with the LCD outside the effective range of the image of the photosensitive film 4, there is a space between the photosensitive surface of the photosensitive film 4 and the display surface of the LCD 3.

Apart from this, it is also possible to adopt an arrangement in which there is provided between the display surface of the LCD 3 and the photosensitive surface of the photosensitive film 4 a transparent glass plate or film of a predetermined thickness, thus substantially maintaining a predetermined distance between them and not holding them in direct contact with each other.

In the transfer apparatus of the present invention, the distance between the LCD 3 (i.e., its display surface) and the photosensitive film 4 (i.e., its photosensitive surface) is preferably 0.01 mm to 3 mm, more preferably 0.1 mm to 3 mm. As stated above, this arrangement is rather disadvantageous from the viewpoint of obtaining a clear transfer image. However, it is a condition necessary for realizing an apparatus actually easy to handle. The disadvantage due to this arrangement can be compensated for by the suppression of light diffusion, which can be achieved by making the sum total t of the thicknesses of the glass substrate 32 and the polarizing film 31 on the photosensitive film 4 side of the LCD 3 mentioned above not more than a predetermined dimension.

In the transfer apparatus of the present invention, it is desirable that the size of the image displayed on the LCD 3 be substantially the same as the size of the image transferred to the photosensitive film 4. This is due to the fact that, in the present invention, a direct transfer system is adopted in which no enlargement or reduction is effected using a lens system, thereby making it possible to achieve a reduction in the size and weight of the apparatus.

The main body case 6 is a case containing the above-mentioned components of the present invention, that is, the back light unit 1, the porous plate 2, the LCD 3, the film pack 5 (or the film case 51), a pair of rollers 61 for transferring a film which has undergone exposure and developing the processing liquid, etc. In the main body case 6, the pair of rollers 61 for transferring a film which has undergone exposure and developing the processing liquid are mounted at a position where they face the exposed-film extraction outlet 53 of the loaded film pack 5 (or the film case 51). Further, the main body case 6 has at a position facing this pair of rollers 61 the outlet 62 for extracting the exposed film 4 from the main body case 6. Further, the main body case 6 is provided with a back-up pressurizing pin 63 which is inserted from an opening on the back side of the exposed-film pack 5 and which presses the film sheets 4 against the front edge of the film case 51, that is, the LCD 3 side.

Although not shown, it goes without saying that the transfer apparatus of the present invention includes a drive source (motor) for driving the pair of rollers 61, a power source for driving the motor and lighting up the bar-like light source 11 of the back light unit 1, electrical equipment for controlling these components, a data processing device for receiving digital image data from a digital image data supply portion to display an image on the LCD 3 and converting the data into image data for LCD display, a control unit, etc.

The transfer apparatus of the present invention is basically constructed as described above.

EXAMPLES

Specific examples of the transfer apparatus of the present invention will now be described.

Example 1 and Comparative Example 1

Figure 5:
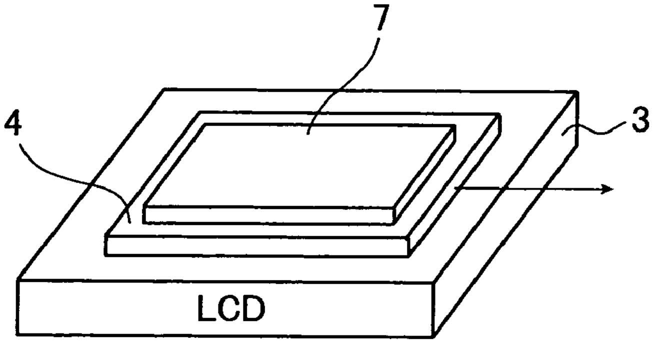
FIG. 5 is a perspective view illustrating an experiment method according to a comparative example.

Using a film pack of "instax mini", mono-sheet type instant photography films (manufactured by Fuji Photo Film Co., Ltd.; image size in terms of diagonal length: 3 in.), as the photosensitive films, the following two cases were compared with each other in terms of the degree to which a scratch is generated: a case in which the LCD surface (screen size: 4 in.) is in contact with the photosensitive surface of the film (Comparative Example 1), and a case in which the LCD surface and the photosensitive surface of the photosensitive film are spaced apart from each other (Example 1). As shown in FIG. 5, in Comparative Example 1, the photosensitive surface of the photosensitive film 4 was held in contact with the surface of the LCD 3, and a load of 30 g was applied by a weight 7, with the photosensitive film 4 being movable.

The comparison of Example 1 with Comparative Example 1 showed that fine scratches were generated on the surface of the photosensitive film 4 when the surface of the LCD 3 was held in contact with the photosensitive surface of the photosensitive film 4, whereas it goes without saying that no such scratches were generated when these components were spaced apart from each other.

Using the transfer apparatus shown in FIG. 2, constructed as described above, digitally-recorded images displayed on the LCD 3 were recorded on the photosensitive films 4 to obtain record images while varying each dimension of the sum totals of the thicknesses of the polarizing plates 31 and 37 and the substrates 32 and 36 on the photosensitive film 4 side (light output side) and the light input side of the LCD 3, the distance between the LCD 3 and the photosensitive film 4, etc. The LCD 3 prepared has a display screen size of 3.5 in. The back light unit 1 prepared has a size corresponding to the display screen size (3.5 in.) of the LCD 3. The bar-like lamp 11 used is a cold-cathode tube having a length of 70 mm. A power source having a direct voltage of 6.5V was used to turn on the cold-cathode tube and the brightness in the center of the back light unit 1 was measured 1 minute after the cold-cathode tube was turned on. The brightness obtained was 2500 Lv. Further, the color of the light source as measured in terms of the chromaticity coordinates was x=y=0.297. This measurement was made with a spectroradiometer CS1000 of Minolta Co., Ltd.

Examples 2-1 to 2-9

First, as the porous plate 2, a porous plate was prepared in which circular through-holes 21 having a diameter of 5 mm were provided at a pitch of 0.1 m (in terms of partition thickness; see FIG. 6A) in a closest packet structure. The thickness of the porous plate 2 was 15 mm. The distance (spacer thickness) from the outlet side (upper surface) of the porous slate 2 to the LCD 3 was 2 mm. The above-mentioned "instax mini" film pack was used as the photosensitive film 4.

In this construction, a transfer test was conducted while varying the dot dimension (shorter side) of the LCD 3 (two levels of 0.13 mm and 0.08 mm), varying the respective sum totals of the thicknesses of the substrates 32, 36 and the polarizing films 31, 37 on the photosensitive film 4 side and the incident side (three levels of 0.93 mm, 0.75 mm, and 0.57 mm), and varying the distance (gap) between the LCD 3 and the photosensitive film 4 (three levels of 1 mm, 2 mm and 3 mm).

Comparative Examples 2-1 to 2-4

As the porous plate 2, there was prepared one in which circular through-holes 21 having a diameter of 5 mm were arranged in a pitch of 0.1 mm in a closest packed structure. Two levels were adopted for the thickness of the porous plate 2 and the distance from the outlet side (upper surface) of the porous plate to the LCD 3. For the first level, the thickness of the porous plate 2 was changed to 10 mm, and the distance from the outlet side (upper surface) of the porous plate to the LCD 3 was changed to 5 mm. For the second level, the same values as in Examples 2-1 to 2-9, to be more specific, 15 mm for the former and 2 mm for the latter were used.

In this construction, a transfer test was conducted, with the dot dimension (shorter side) of the LCD 3 being 0.08 mm or 0.13 mm, and the sum totals of the thicknesses of the substrates 32, 36 and the polarizing films 31, 37 on the photosensitive film 4 side and the incident side being 1.3 mm, respectively. The distance between the LCD 3 and the photosensitive film 4 was changed in four levels of 0 mm, 1 mm, 3 mm and 5 mm while these components are held in close contact with each other.

Examples 3-1 to 3-13

With a construction using a plurality of porous plates 2 composed of various combinations of diameters with thicknesses for through-holes 21, including the same porous plate 2 as that used in Examples 2-1 to 2-9, a photosensitive film 4 of the same type, and an LCD 3 with a dot dimension (shorter side) of 0.13 mm, a transfer test was conducted, while varying the respective sum totals of the thicknesses of the substrates 32, 36 and the polarizing films 31, 37 on the photosensitive film 4 side and the incident side (two levels of 0.93 mm and 0.57 mm) and varying also the distance between the LCD 3 and the photosensitive film 4 (six levels). Three levels of 0.5 mm, 1.5 mm and 5.0 mm were used for the diameter of the through-holes 21 of the porous plate 2, six levels of 1.5 mm, 3.5 mm, 4.5 mm, 5 mm, 10 mm and 15 mm for the thickness of the porous plate 2, and four levels for the "thickness of porous plate/through-hole dimension of porous plate".

Comparative Examples 3-1 to 3-2

Under the same conditions as in Examples 3-1 to 3-13, a transfer test was conducted, with the distance between the LCD 3 and the photosensitive film 4 being larger (5 mm) than the case of Examples 3-1 to 3-13.

In the above-mentioned transfer tests, the light-up time of the light source was adjusted such that transfer images of substantially the same density were obtained. For evaluation, the transfer images were observed by using a microscope with a magnifying power of 10, evaluating the clarity of the RGB dots in five levels according to Table 1.

Table 2 shows the results of Examples 2-1 to 2-9 and Comparative Examples 2-1 to 2-4, and Table 3 shows the results of Examples 3-1 to 3-13 and Comparative Examples 3-1 to 3-2.

TABLE 1

| Evaluation Point | Status |
|---|---|
| 1 | RGB dots are very clearly visible. |
| 2 | RGB dots are clearly visible. |
| 3 | RGB dots are visible without overlapping. |
| 4 | Not more than half the RGB dots are overlapping. |
| 5 | RGB dots are overlapping and indistinguishable. |

TABLE 2

| Level | Thickness of substrate and polarizing film on photosensitive film side (mm) | Thickness of substrate and polarizing film on incident side (mm) | LCD dot shorter side length (mm) | Distance between LCD and photosensitive film (mm) | Diameter or equivalent diameter (mm) | Thickness (mm) | Thickness/ diameter ratio | Evaluation |
|---|---|---|---|---|---|---|---|---|
| Example 2-1 | 0.93 | 0.93 | 0.13 | 1 | 5 | 15 | 3 | 3 |
| Example 2-2 | 0.93 | 0.75 | 0.13 | 1 | 5 | 15 | 3 | 2.5 to 3 |
| Example 2-3 | 0.75 | 0.75 | 0.13 | 1 | 5 | 15 | 3 | 2.5 |
| Example 2-4 | 0.57 | 0.57 | 0.13 | 1 | 5 | 15 | 3 | 2 |
| Example 2-5 | 0.93 | 0.93 | 0.08 | 1 | 5 | 15 | 3 | 2.5 to 3 |
| Example 2-6 | 0.75 | 0.75 | 0.08 | 1 | 5 | 15 | 3 | 2.5 |
| Example 2-7 | 0.57 | 0.57 | 0.08 | 1 | 5 | 15 | 3 | 2 |
| Example 2-8 | 0.57 | 0.57 | 0.08 | 2 | 5 | 15 | 3 | 2.5 |
| Example 2-9 | 0.57 | 0.57 | 0.08 | 3 | 5 | 15 | 3 | 3 |

TABLE 2-continued

| Level | Thickness of substrate and polarizing film on photosensitive film side (mm) | Thickness of substrate and polarizing film on incident side (mm) | LCD dot shorter side length (mm) | Distance between LCD and photosensitive film (mm) | Diameter or equivalent diameter (mm) | Thickness (mm) | Thickness/diameter ratio | Evaluation |
|---|---|---|---|---|---|---|---|---|
| Comparative Example 2-1 | 1.3 | 1.3 | 0.13 | 0 | 5 | 10 | 2 | 5 |
| Comparative Example 2-2 | 1.3 | 1.3 | 0.13 | 1 | 5 | 15 | 3 | 4.5 |
| Comparative Example 2-3 | 1.3 | 1.3 | 0.13 | 3 | 5 | 15 | 3 | 5 |
| Comparative Example 2-4 | 1.3 | 1.3 | 0.13 | 5 | 5 | 15 | 3 | 5 |

TABLE 3

| Level | Thickness of substrate and polarizing film on photosensitive film side (mm) | Thickness of substrate and polarizing film on incident side (mm) | LCD dot shorter side length (mm) | Distance between LCD and photosensitive film (mm) | Diameter or equivalent diameter (mm) | Thickness (mm) | Thickness/diameter ratio | Evaluation |
|---|---|---|---|---|---|---|---|---|
| Example 3-1 | 0.93 | 0.93 | 0.13 | 0 | 5 | 15 | 3 | 2 |
| Example 3-2 | 0.93 | 0.93 | 0.13 | 0.2 | 5 | 15 | 3 | 2 |
| Example 3-3 | 0.93 | 0.93 | 0.13 | 0.5 | 5 | 15 | 3 | 2 |
| Example 3-4 | 0.93 | 0.93 | 0.13 | 1 | 5 | 15 | 3 | 3 |
| Example 3-5 | 0.93 | 0.93 | 0.13 | 2 | 5 | 15 | 3 | 3 |
| Example 3-6 | 0.93 | 0.93 | 0.13 | 3 | 5 | 15 | 3 | 3.5 |
| Example 3-7 | 0.57 | 0.57 | 0.13 | 1 | 5 | 15 | 3 | 2 |
| Example 3-8 | 0.57 | 0.57 | 0.13 | 3 | 5 | 15 | 3 | 2.5 |
| Example 3-9 | 0.93 | 0.93 | 0.13 | 3 | 1.5 | 4.5 | 3 | 3.5 |
| Example 3-10 | 0.93 | 0.93 | 0.13 | 3 | 0.5 | 1.5 | 3 | 3.5 |
| Example 3-11 | 0.93 | 0.93 | 0.13 | 3 | 0.5 | 3.5 | 7 | 1.5 |
| Example 3-12 | 0.93 | 0.93 | 0.13 | 3 | 0.5 | 5 | 10 | 1 |
| Example 3-13 | 0.93 | 0.93 | 0.13 | 3 | 0.5 | 10 | 20 | 1 |
| Comparative Example 3-1 | 0.93 | 0.93 | 0.13 | 5 | 5 | 15 | 3 | 5 |
| Comparative Example 3-2 | 0.57 | 0.57 | 0.13 | 5 | 5 | 15 | 3 | 5 |

Examination of the Results

As shown in Table 2, from the comparison of Examples 2-1 to 2-9 with Comparative Examples 2-1 to 2-4, it can be seen that when the sum totals of the thicknesses of the substrates 32, 36 and the polarizing film 31, 37 on the photosensitive film 4 side and the incident side are less than 1 mm, respectively, and the thickness of the porous plate 2 is three times the diameter of the through-holes 21, the dot transfer condition is markedly improved. In this case, the dot dimension (shorter side) of the LCD 3 does not influence so much.

As stated above, the reduction in the respective sum totals of the thicknesses of the substrates 32, 36 and the polarizing films 31, 37 on the photosensitive film 4 side and the incident side is very effective in improving the image quality. Specifically, when the sum total thickness t varies as: 0.93 mm, 0.75 mm, and 0.57 mm, the difference is clearly to be seen (comparison of Examples 2-1 to 2-4, Examples 2-5 to 2-8).

The distance between the LCD 3 and the photosensitive film 4 does not influence the image quality so much as long as it is within the range of approximately 3 mm (comparison of Examples 2-7 to 2-9). This is very advantageous in producing the apparatus since it facilitates the handling of the photosensitive film 4 (film sheet).

As shown in Table 3, from the comparison of Examples 3-1 to 3-1.3 with Comparative Examples 3-1 and 3-2, it can be seen that while there is no great change as long as the distance between the LCD 3 and the photosensitive film 4 is approximately 3 mm or less, the dot transfer condition (clarity) deteriorates when the distance is 5 mm exceeding 3 mm.

The fact that the distance between the LCD 3 and the photosensitive film 4 does not influence the image quality so much as long as it is not more than 3 mm is very advantageous in producing the apparatus since it helps to facilitate the handling of the photosensitive film 4 (the above-mentioned film sheet). It can be seen that, if the sum total t of the thicknesses of the substrate 32 and the polarizing film 31 on the photosensitive film 4 side is the same as the sum total of the thicknesses of the substrate 36 and the polarizing film 37 on the incident side, as the distance between the LCD 3 and the photosensitive film 4 is gradually shortened as: 3 mm, 2 mm, 1 mm, and 0.5 mm, the evaluation becomes higher, providing increasingly satisfactory results.

Regarding the thickness of the porous plate 2, it can be seen that, from the relationship between the thickness of the porous plate 2 and the dimension of the through-holes provided in the porous plate 2, a markedly desirable effect is achieved when the value of the coefficient: "thickness of porous plate/through-hole dimension of porous plate" is not smaller than a certain value. That is, the above-mentioned value indicates the degree to which the light transmitted through the porous plate is approximated to parallel rays.

Specifically, a reduction in the dimension of the through-holes or an increase in the thickness of the porous plate is effective. To achieve a reduction in the thickness of the entire apparatus, however, the former is more desirable. Due to the limitations in production, the lower limit of the through-hole dimension is approximately 0.2 mm. From the practical point of view, values of approximately 0.5 mm. to 2 mm are preferable. Regarding the thickness, values of approximately 3 mm to 20 mm are preferable from the practical point of view. While in the above example the value of the "thickness of porous plate/through-hole dimension of porous gplate" is 3, this value is preferably not less than 5, and more preferably not less than 7.

Another experiment showed that, due to the reduction in the LCD dot size, each dot was not so clearly transferred as compared with the case of the "transfer apparatus" disclosed in JP 11-242298 A. In particular, when the LCD dot size is not more than 0.2 mm, the tendency is remarkable.

From the above results, the effect obtained by the transfer apparatus of the present invention is obvious.

That is, in the transfer apparatus of the present invention, the sum total t of the thicknesses of the substrate 32 and the polarizing film 31 at least on the photosensitive film side of the LCD is set at not more than a predetermined value, that is, not more than 1.0 mm, more preferably not more than 0.8 mm, and most preferably not more than 0.6 mm, whereby it is possible to substantially improve the clarity of the transferred image. Further, as can be seen, by spacing apart the LCD and the photosensitive film from each other by a predetermined distance of 0.01 to 3 mm, it is possible to obtain an apparatus which is easy to handle and of a simple structure, making it possible to substantially improve the clarity of the transferred image.

Thus, in the transfer apparatus of the present invention, it is possible to set the sum total of the thicknesses of the substrate and the polarizing film on the photosensitive film side of the LCD, and the distance between the LCD and the photosensitive film in accordance with the clarity desired for the transfer image.

While various embodiments and examples of the transfer apparatus of the present invention have been described in detail, the present invention is not restricted to these embodiments and examples. Various improvements and modifications are naturally possible without departing from the scope of the invention. For example, the back light unit as the light source and the LCD as the image display device are not restricted to the above-described ones. It is also possible to adopt one with various functions within the permissible range. Further, the digitally-recorded image (digital image data) used in the present invention may also be a digitally-recorded image read with a scanner or the like from a transmission original including a photographic film such as a negative film or a reversal film, or a reflection original such as a photograph.

As described above in detail, in accordance with the present invention, it is possible to realize a transfer apparatus which enables, with a simple structure, actual reduction in size, weight, power consumption, and cost.

The effect of the present invention can be further enhanced by adding the above-mentioned additional conditions to the above-described basic construction.

Further, in accordance with the present invention, it is possible to use from a liquid crystal display of an ordinary pixel density to a liquid crystal display of a high-definition screen with high pixel density, making it possible to obtain a transfer image of a desired clarity from among images ranging from a photographic image that is satisfactory from the practical viewpoint to a high definition transfer image of higher clarity.

What is claimed is:

1. A transfer apparatus comprising:

a light source;

a transmission-type image display device in which a liquid crystal layer is held between two sets of substrates and polarizing plates; and a photosensitive recording medium, wherein the light source, the transmission-type image display device and the photosensitive recording medium are arranged in series along a direction in which light from the light source advances, and a display image transmitted from the transmission-type image display device is transferred to the photosensitive recording medium, and wherein the transmission-type image display device and the photosensitive recording medium are arranged in a non-contact state, and a distance between the transmission-type image display device and the photosensitive recording medium and a sum total of thicknesses of a substrate and a polarizing plate at least on a side of the photosensitive recording medium in the transmission-type image display device are set in accordance with a definition of the display image.

2. The transfer apparatus of claim 1, wherein the transmission-type image display device and a substantially parallel rays generating element disposed between the light source and the transmission-type image display device are arranged in a non-contact state.

* * * * *